UNITED STATES PATENT OFFICE.

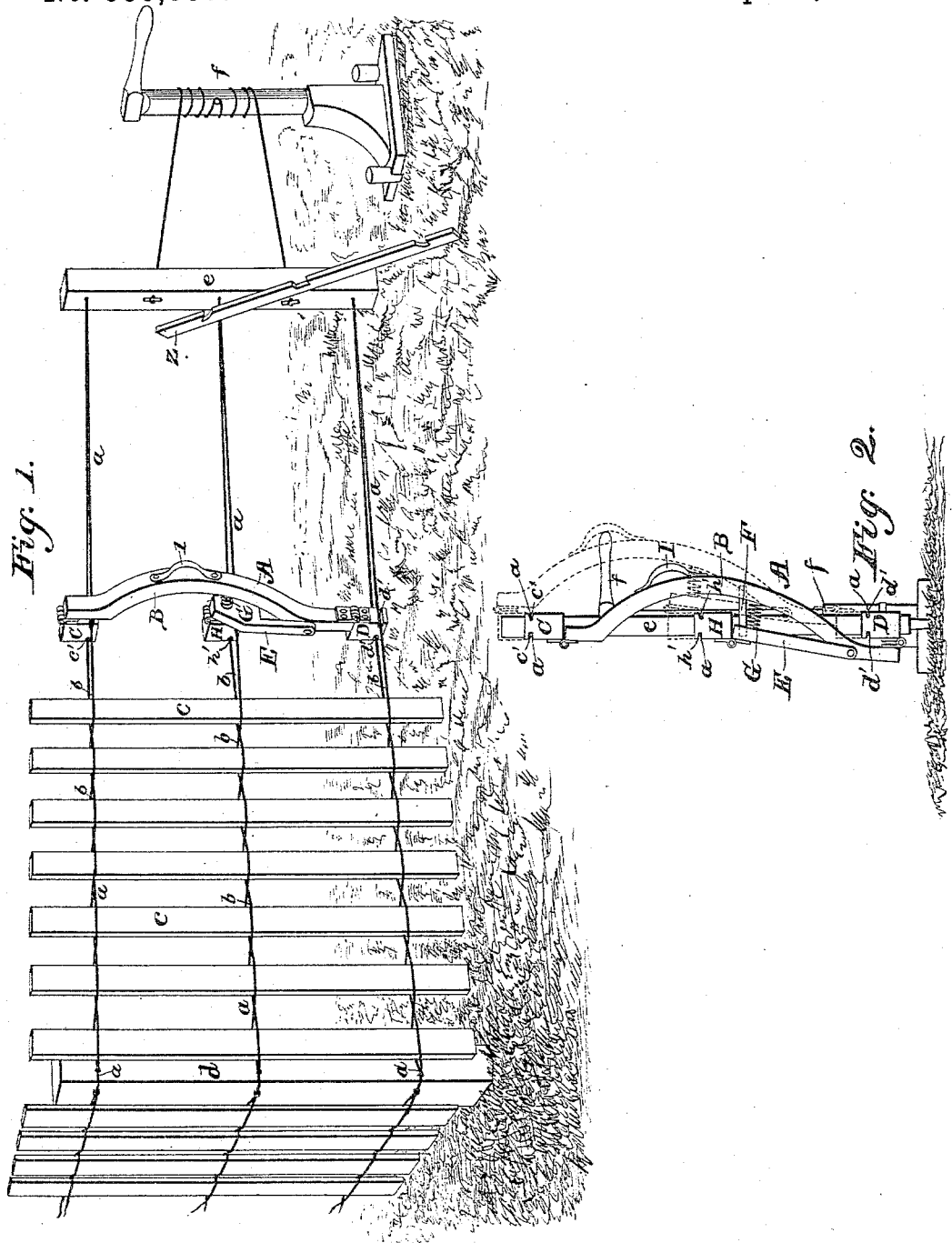

PERRY C. FLORA, OF EATON, OHIO.

MACHINE FOR BUILDING COMBINED PALING AND WIRE FENCES.

SPECIFICATION forming part of Letters Patent No. 339,397, dated April 6, 1886.

Application filed February 1, 1886. Serial No. 190,472. (No model.)

*To all whom it may concern:*

Be it known that I, PERRY C. FLORA, a citizen of the United States, residing at Eaton, in the county of Preble and State of Ohio, have invented a new and useful Improvement in Machines for Building Combined Paling and Wire Fences, of which the following is a specification, reference being had to the accompanying drawings.

My invention relates to an improvement in machines for building combined paling and wire fences; and it consists in the peculiar construction and combination of devices that will be more fully set forth hereinafter, and particularly pointed out in the claims.

In the drawings, Figure 1 is a perspective view of a device embodying my invention in use on a fence in process of construction. Fig. 2 is a side elevation of the same in another position, the fence being shown in transverse section.

Fences are constructed that are composed of two or more double strands of stretched parallel wires, $a$, crossed to form loops $b$, in which palings $c$ are inserted, the fence being thus composed of the stretched wires and the palings woven into the wires.

In Fig. 1, $d$ represents a fence-post, which is firmly secured in the ground, and to which are secured three parallel pairs of wires, $a$, the free ends of which, while the fence is in process of construction are secured to a draw-bar, $e$, which is attached to a windlass, $f$, or other suitable apparatus for stretching and slackening the wires.

A represents my improved apparatus, which has a bar, B, bent outwardly at the center in substantially the shape of a bow.

To the upper end of the bar B is hinged a block, C, which is adapted to swing over the top of the bar, and has grooves or notches $c'$ on opposite sides near one end.

D represents a similar block, which has grooves or notches $d'$ in opposite sides, and is hinged to the lower end of the bar B, and is adapted to swing inwardly therefrom.

E represents an arm that is pivoted to the bar B, near the lower end thereof, and which extends upwardly to near the center of the said bar. A flexible strap or band, F, which is made of leather or other suitable material, connects the upper end of the arm and the center of the bar, and serves as a stop to limit the outward movement of the arm, and a coiled extensile spring, G, is inserted between the arm and the opposing face or side of the bar, so as to keep the arm normally in line with the straight end portions of the bar.

To the upper end of the pivoted arm is hinged a block, H, which is provided with the grooves or notches $h'$, on opposite sides near one end of the block, and is adapted to swing over the top of the arm in the same direction with the block C. The blocks C, H, and D are turned down and are attached to the upper, middle, and lower pairs of wires $a$, respectively, the said wires engaging with the grooves or notches in the blocks, and thereby the wires are spread apart, as shown at Fig. 1. A handle, I, is attached to the outer side of the bar B, near the center thereof, and the operator grasps this handle and presses the bar inwardly at its lower end toward the wires and downwardly simultaneously, which causes the hinged blocks to turn over, as shown at Fig. 2, and twist the three pairs of wires and thereby form loops therein to receive a picket or paling which is inserted. The device A is then moved laterally from the paling a suitable distance and without detaching it from the wires, when a reverse movement is given to the bar B, which causes the hinged blocks to assume their initial position shown in Fig. 1, and thereby again twist the wires to form loops for the reception of a second paling, and so on until the fence is completed. As the wires become too tight during the construction of the fence, they are slackened from time to time by the windlass or other suitable device. The wires are firmly secured to posts secured in the ground at suitable distances apart, and thus an exceedingly strong, tight, and cheap fence may be very readily built. A suitable notched gage, Z, is used during the process of construction to keep the wires parallel and at the proper height from the ground.

Heretofore in building fences of this character, when the loops were twisted in the wires by hand, from ten to fifteen rods have been considered a good day's work for a single man, but by means of my improved apparatus for twisting the wires from forty to fifty rods of fence per day can be built by one man.

The function of the spring-actuated pivoted arm is to yield slightly when the bar is moved down or up, to prevent too great strain on the central pair of wires.

Having thus described my invention, I claim—

1. The combination of the bar having the hinged blocks, and the spring-actuated pivoted arm attached to the bar, and having the hinged block, for the purpose set forth, substantially as described.

2. The combination of the bar B, having the handle I, and the hinged blocks C and D, and the arm pivoted to the bar, the flexible band connecting the bar and the arm, the spring bearing between the arm and the bar, and the hinged block H, attached to the free end of the arm, for the purpose set forth, substantially as described.

3. The movable bar having the oscillating blocks connected directly thereto, the pivoted arm attached to the bar, and the intermediate oscillating block attached to the said arm, substantially as described.

4. The combination of the bar having the oscillating blocks, the spring-actuated arm attached to the bar and carrying the intermediate oscillating block, and the stop for limiting the outward movement of the said arm, substantially as described.

In testimony that I claim the foregoing as my own I have hereto affixed my signature in presence of two witnesses.

PERRY C. FLORA.

Witnesses:
JAMES M. FRAME,
JOHN B. GANS.